United States Patent
Zimmermann et al.

(10) Patent No.: US 9,573,704 B2
(45) Date of Patent: Feb. 21, 2017

(54) SATELLITE SOLAR GENERATOR WING AND SATELLITE

(71) Applicant: AIRBUS DS GMBH, Taufkirchen (DE)

(72) Inventors: Claus Zimmermann, Munich (DE); Rene Meurer, Bruckmuehl (DE); Thomas Pfefferkorn, Zorneding (DE); Jens Birkel, Ottobrunn (DE)

(73) Assignee: AIRBUS DS GMBH, Taufkirchen (DE)

( * ) Notice: Subject to any disclaimer, the term of this patent is extended or adjusted under 35 U.S.C. 154(b) by 0 days.

(21) Appl. No.: 14/669,619

(22) Filed: Mar. 26, 2015

(65) Prior Publication Data

US 2015/0274327 A1 Oct. 1, 2015

(30) Foreign Application Priority Data

Mar. 27, 2014 (DE) .......................... 10 2014 004 357

(51) Int. Cl.
*B64G 1/22* (2006.01)
*B64G 1/44* (2006.01)

(52) U.S. Cl.
CPC ............... *B64G 1/443* (2013.01); *B64G 1/222* (2013.01); *B64G 1/44* (2013.01)

(58) Field of Classification Search
CPC ........... B64G 1/44; B64G 1/443; B64G 1/222; H02S 30/20
USPC .................... 244/172.6–172.9; 136/243–245
See application file for complete search history.

(56) References Cited

U.S. PATENT DOCUMENTS

| 5,785,280 A | 7/1998 | Baghdasarian | |
|---|---|---|---|
| 6,010,096 A | 1/2000 | Baghdasarian | |
| 6,909,042 B2 * | 6/2005 | Geyer | H02S 30/20 136/244 |
| 8,035,573 B2 * | 10/2011 | Thompson | B64G 1/222 343/757 |
| 2004/0094193 A1 * | 5/2004 | Geyer | H02S 30/20 136/244 |

FOREIGN PATENT DOCUMENTS

| DE | 199 34 511 | 1/2000 |
|---|---|---|
| DE | 101 34 052 | 1/2003 |
| EP | 0 754 625 | 1/1997 |
| WO | 02/079034 | 10/2002 |

OTHER PUBLICATIONS

German Action conducted in counterpart German Appln. No. 10 2014 004 357.6 (Nov. 24, 2014) (w/ partial English language translation).
European Action conducted in counterpart European Appln. No. 150 00 782.1-1754 (Aug. 31, 2015) (w/ partial English language translation).

* cited by examiner

*Primary Examiner* — Richard G Davis
(74) *Attorney, Agent, or Firm* — Greenblum & Bernstein, P.L.C.

(57) ABSTRACT

Satellite solar generator wing including solar panels having at least two fixed solar panels and at least one semi-fixed solar panel. The solar panels are connected to one another in order to assume an operating position and a transport position, and, in the transport position, the solar panels are retained on top of one another and the semi-fixed solar panel is arranged in a freely oscillating manner between the two fixed solar panels.

20 Claims, 5 Drawing Sheets

SATELLITE SOLAR GENERATOR WING AND SATELLITE

CROSS-REFERENCE TO RELATED APPLICATIONS

The present application claims priority under 35 U.S.C. §119(a) of German Patent Application No. 10 2014 004 357.6 filed Mar. 27, 2014, the disclosure of which is expressly incorporated by reference herein in its entirety.

BACKGROUND OF THE EMBODIMENTS

1. Field of the Invention

The invention relates to a satellite solar generator wing and a satellite having at least one satellite solar generator wing.

2. Discussion of Background Information

Ever greater performance demands are being placed on satellites, which demands have the consequence that the output of a satellite solar generator wing must increase. Aside from new, energy-efficient solar cells, which are mounted on the individual solar panels of a satellite solar generator wing, the increased outputs can only be achieved in that the active area of the satellite solar generator wing, that is, the area covered by solar cells, is increased. For this purpose, the individual solar panels must become larger, or the number thereof must increase. However, the solar panel size is limited due to the size of the satellite. Regardless of this, it must be taken into consideration that the mass of a satellite solar generator wing increases as the active surface is enlarged. Accordingly, the mass that needs to be transported into space by a carrier rocket also increases, which causes high costs.

The aim is therefore to develop new satellite solar generator wings which have an improved power-to-weight ratio, that is, a high output with relatively low weight. For this purpose, satellite solar generator wings are known from the prior art which comprise both fixed and also semi-fixed solar panels, which are lighter than conventional fixed solar panels that are constructed from a honeycomb structure. Satellite solar generator wings of this type are also referred to as hybrid solar generators and are known from EP 0 754 625 A1, for example. The hybrid solar generators are folded into their transport position in a conventional manner, in which position they bear against a satellite wall in the folded state. By means of a retainer system, the satellite solar generator wing is held in this transport position in a securing manner, wherein the system is coupled to each of the solar panels, in order to fix the individual solar panels in their respective position. In this manner, the oscillation amplitudes of the solar panels occurring during the launch phase of the carrier rocket are to be minimized.

SUMMARY OF THE EMBODIMENTS

Embodiments of the invention create a satellite solar generator wing that ensures a secure storage of the solar panels during transport using simple means.

According to embodiments, a satellite solar generator wing with at least two fixed solar panels and at least one semi-fixed solar panel are connected to one another so that the solar panels can assume an operating position and a transport position. The solar panels are retained on top of one another in the transport position, and the semi-fixed solar panel is arranged in a freely oscillating manner between the two fixed solar panels in the transport position.

The basic idea of the invention is thus an entirely new approach, since the semi-fixed solar panel is decoupled from the fixed solar panels. In contrast to the prior art, the semi-fixed solar panel, which lies between the two fixed solar panels, is given freedom to oscillate, so that the semi-fixed solar panel can move relative to the fixed solar panels in the transport position. It has been found that, depending on the rigidity, the semi-fixed solar panels exhibit a significantly different oscillation behavior in comparison to the fixed solar panels, so that an oscillation-decoupling of all solar panels leads to an undefined oscillation behavior of the folded satellite solar generator wing during the launch phase. According to the idea of the invention, the semi-fixed solar panel is therefore oscillation-decoupled from the other solar panels.

Generally, the semi-fixed solar panel is embodied in a more flexible manner than the fixed solar panel.

One aspect of the invention provides at least one coupling unit that can be released for the purpose of attaining the operating position. The fixed solar panels are securely coupled to one another by the coupling unit in the transport position. By way of the coupling unit, the solar panels are held in their operating position. The coupling unit can be released, the solar panels unfold and the satellite solar generator wing transitions into its operating position. In particular, the coupling unit couples the fixed solar panels to one another in such a manner that a predefined distance is present between the panels. The coupling unit can be a holding-down system that comprises at least one bushing per fixed solar panel and a pin that engages in the bushing.

A further aspect of the invention provides that the at least two fixed solar panels are oscillation-coupled with one another in the transport position, in particular via the at least one coupling unit. Accordingly, in the transport position, the at least two fixed solar panels form a kind of first oscillation system of the satellite solar generator wing, which system is independent from the semi-fixed solar panel, even though the latter is arranged between the two fixed solar panels. In the transport position, the solar panels thus have a kind of sandwich configuration, in which the surrounding fixed solar panels are oscillation-coupled to one another and oscillation-decoupled from the semi-fixed solar panel positioned therebetween.

A further aspect of the invention provides that the semi-fixed solar panel comprises at least one opening which is provided in the region of the coupling unit, so that at least one segment of the coupling unit extends through the opening without binding the semi-fixed solar panel to the coupling unit. The coupling unit can thus be provided in any region of the solar panels, in particular in a central region of the solar panels. Accordingly, if the coupling unit is a known holding-down system, the pin or the bushing extends through the opening of the semi-fixed solar panel.

In particular, at least the fixed solar panels comprise movement restrictors which limit the movement amplitude of the semi-fixed solar panels relative to the fixed solar panels. Because of the movement restrictors, the semi-fixed solar panel can only freely oscillate up to a certain deflection. The oscillation amplitudes can be the amplitudes of oscillation out of the panel plane.

A further aspect of the invention provides that, in the transport position, a gap is present between the movement restrictors and a corresponding contact surface on the opposing component, in order to allow an oscillation of the solar panels relative to one another. The semi-fixed solar panel can thus freely oscillate perpendicular to the panel plane over the width of the gap, wherein the semi-fixed solar panel strikes one of the corresponding movement restrictors with the contact surface in the case of a greater oscillation amplitude. In this manner, the oscillation amplitude or oscillation deflection is limited.

According to a further aspect of the invention, the movement restrictors and the corresponding contact surfaces are embodied such that the movements of the semi-fixed solar panel relative to the fixed solar panels on the panel plane are limited. The movements on the panel plane are, for example, movements in the two spatial directions x and y, whereas the oscillation amplitude is limited in the z-direction. In the event of contact between the movement restrictors and the corresponding contact surface, a high transmission of force can also take place.

Furthermore, in the transport position, the movement restrictors and the correspondingly shaped contact surfaces preferably engage with one another in every relative position of the panels, that is, in any oscillation position, so that contact on the panel plane is ensured.

A further aspect of the invention provides that the semi-fixed solar panel comprises reinforcing elements. Accordingly, the semi-fixed solar panel can be embodied in a very flexible and light manner, for example, as a foil. The reinforcing elements ensure that the solar panel nevertheless exhibits the required rigidity. A semi-fixed solar panel with an extremely high power-to-weight ratio is thus possible.

In particular, the reinforcing elements and the movement restrictors interact as contact surfaces, in order to limit the movement amplitude of the semi-fixed solar panel. This saves additional weight, since the reinforcing elements that are provided for the reinforcement of the semi-fixed solar panel simultaneously form the contact surfaces for the movement restrictors. In addition, the design of the semi-fixed solar panel corresponds to a lightweight construction.

According to one aspect of the invention, the reinforcing elements form at least one frame for the semi-fixed solar panel. In this manner, it is ensured that the semi-fixed solar panel is torsion-resistant and bend-resistant and retains its form to the greatest possible extent.

A further aspect of the invention envisages that two semi-fixed solar panels lying on top of one another in the transport position are provided, which panels are arranged in a freely oscillating manner between two fixed solar panels in the transport position. Accordingly, more than just one semi-fixed solar panel that is freely oscillating can be intermediately positioned between the two enclosing fixed solar panels. Through the greater number of the semi-fixed solar panels, the total output of the satellite solar generator wing can be increased, since the total active area thereof is greater. The total weight of the satellite solar generator wing, however, only increases by a relatively small amount, so that the power-to-weight ratio of the satellite solar generator wing increases enormously.

In particular, at least one of the two semi-fixed solar panels comprises movement restrictors in order to limit the amplitude of the movement relative to the other semi-fixed solar panel. By means of the movement restrictors, it is achieved that the two freely oscillating semi-fixed solar panels do not strike one another and/or do not become damaged during the launch phase.

A further aspect of the invention envisages that two fixed solar panels and the corresponding semi-fixed solar panels respectively forming a solar panel system, and multiple solar panel systems can be provided. The satellite solar generator wing can thus be modularly expanded, so that two semi-fixed solar panels that are arranged between two fixed solar panels in the transport position typically form a solar panel system with these two outer fixed solar panels. The fixed solar panels of a solar panel system are oscillation-coupled to one another. However, they can also be oscillation-coupled to the fixed solar panels of another solar panel system. Depending on the size of the satellite solar generator wing, it can be provided that all fixed solar panels are oscillation-coupled to one another. The semi-fixed solar panels are intermediately positioned between two consecutive fixed solar panels in an oscillation-decoupled manner, preferably in pairs.

The invention also relates to a satellite having at least one solar generator wing of the type previously described. Normally, however, a satellite comprises two satellite solar generator wings of this type, since this is advantageous for position control.

Embodiments of the invention are directed to a satellite solar generator wing that includes solar panels including at least two fixed solar panels and at least one semi-fixed solar panel. The solar panels are connected to one another in order to assume an operating position and a transport position, and, in the transport position, the solar panels are retained on top of one another and the semi-fixed solar panel is arranged in a freely oscillating manner between the two fixed solar panels.

In embodiments, the satellite solar generator wing can further include at least one coupling unit that is structured and arranged to be releasable to assume the operating position, and is structured and arranged to couple the two fixed solar panels to one another in the transport position.

According to other embodiments, the at least two fixed solar panels may be oscillation-coupled to one another in the transport position. The at least two fixed solar panels can be oscillation-coupled to one another in the transport position by at least one coupling unit.

In further embodiments, the semi-fixed solar panel may include at least one opening located in a region of the at least one coupling unit that is dimensioned so that at least one segment of the at least one coupling unit extends through the opening without binding the semi-fixed solar panel to the at least one coupling unit.

In accordance with still other embodiments of the invention, movement restrictors can be structured and arranged to limit movement amplitude of the semi-fixed solar panels relative to the fixed solar panels. At least the fixed solar panels may include the movement restrictors. Further, in the transport position, a gap can be present between the movement restrictors and a corresponding contact surface on an opposing component, in order to allow oscillation of the solar panels relative to one another. The movement restrictors and the corresponding contact surfaces can be embodied so as to limit movements of the semi-fixed solar panel relative to the fixed solar panels on the panel plane. Moreover, in the transport position, the movement restrictors and the corresponding contact surfaces can be engageable with one another and secure the semi-fixed solar panel against a lateral deflection between the fixed solar panels.

According to further embodiments, reinforcing elements can be provided on the at least one semi-fixed solar panel. The reinforcing elements can have the contact surfaces arranged to face movement restrictors in order to limit a movement amplitude of the semi-fixed solar panel. Further, the reinforcing elements may form at least one frame for the semi-fixed solar panel.

In accordance with still other embodiments of the invention, the at least one semi-fixed solar panel may include two semi-fixed solar panels arranged to lie directly on top of one another in the transport position and arranged in a freely oscillating manner between two fixed solar panels in the transport position. At least one of the two semi-fixed solar panels may include movement restrictors structured and arranged to limit an amplitude of the movement relative to the other of the two semi-fixed solar panel.

In embodiments, two fixed solar panels and the at least one semi-fixed solar panel can form a solar panel system. Further, the satellite solar generator wing can include a plurality of the solar panel systems.

According to embodiments, a satellite can include at least one satellite solar generator wing, as defined above.

Embodiments are directed to a method for deploying a satellite that assumes a transport position and operating position. The method includes connecting solar panels of a satellite solar generator wing, which include at least two-fixed panels and at least one semi-fixed panel, to one another and arranging the solar panels in the transport position so that the solar panels are arranged one on top of the other so that the at least one semi-fixed solar panel is arranged in a freely oscillating manner between the two fixed solar panels.

In accordance with still yet other embodiments of the present invention, the method can also include releasing the solar panels from the transport position so that the satellite solar wing generator assumes an operating position.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
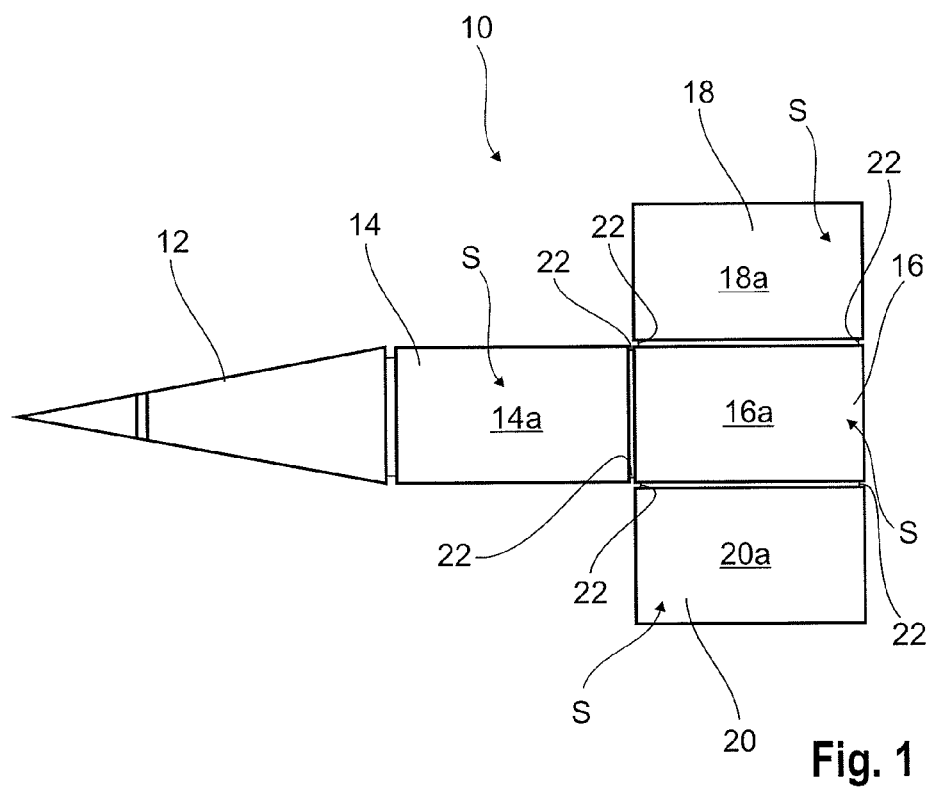
FIG. 1 shows a schematic illustration of a satellite solar generator wing according to the invention in its operating position.

In FIG. 1, a satellite solar generator wing 10 is schematically illustrated in its operating position, which wing is attached to a satellite wall not shown here by an articulated rod system 12, also known as a yoke.

In the embodiment shown, the satellite solar generator wing 10 comprises two fixed solar panels 14, 16 and two semi-fixed solar panels 18, 20, which are embodied as solar panels lateral to the fixed solar panel 16.

The solar panels 14 through 20 comprise respectively one solar cell side 14a through 20a, on which side the solar cells S are attached and which is aligned with the sun in the operating position.

Figure 2:
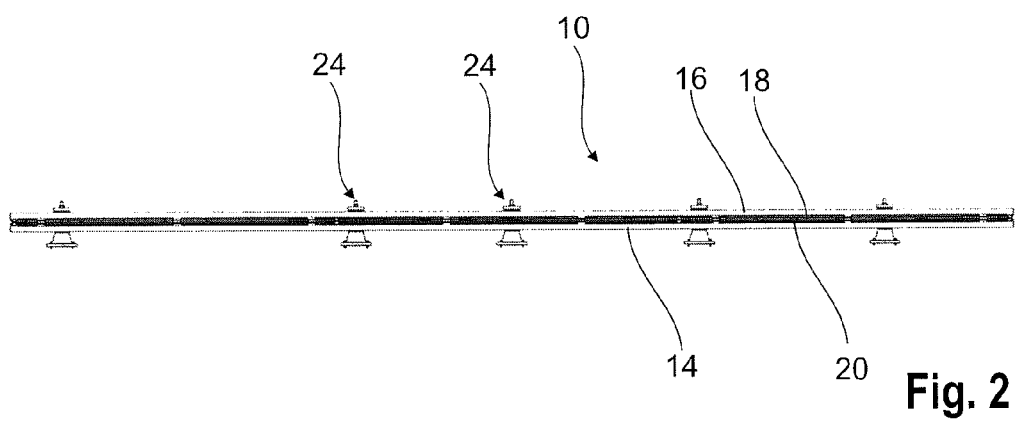
FIG. 2 shows the satellite solar generator wing from FIG. 1 in its transport position.

The individual solar panels 14 through 20 are pivotably connected to one another via joints 22 which are arranged at the edge of the solar panels 14 through 20 and which can be used to move the solar panels 14 through 20 out of the folded transport position shown in FIG. 2 into the operating position shown in FIG. 1. For this purpose, the joints 22 are typically pre-stressed in the unfolding direction, that is, in the direction of the operating position. In this way, solar panels 14, 16 are initially retained securely in their transport position by coupling units 24 (FIG. 2). The exact functioning of the coupling units 24 is explained later on the basis of FIG. 5.

The transport position illustrated in FIG. 2 is characterized in that the solar panels 14 through 20 are folded relative to one another in such a manner that they are arranged congruently on top of one another. In this folded state, they are arranged at a distance from a satellite side wall.

Alternatively, however, the solar panels 14 through 20 can also have different sizes, in particular the lateral solar panels. For example, these can be merely half as high.

From the transport position of the satellite solar generator wing 10 shown in FIG. 2, it also follows that, in the folded state, the solar panels 14 through 20 are arranged such that the two fixed solar panels 14, 16 have accommodated the two semi-fixed solar panels 18, 20 between them. This means that, in its transport position, the satellite solar generator wing 10 is folded such that the two semi-fixed solar panels 18, 20 lie between the two fixed solar panels 14, 16.

The fixed solar panels 14, 16, which are embodied in a stronger and thicker manner than the semi-fixed solar panels 18, 20, thus form in the transport position an outer protection for the thin, semi-fixed solar panels 18, 20. This applies not only to mechanical stresses, but also to radiation-induced stresses during the transport phase in outer space.

Figure 3:
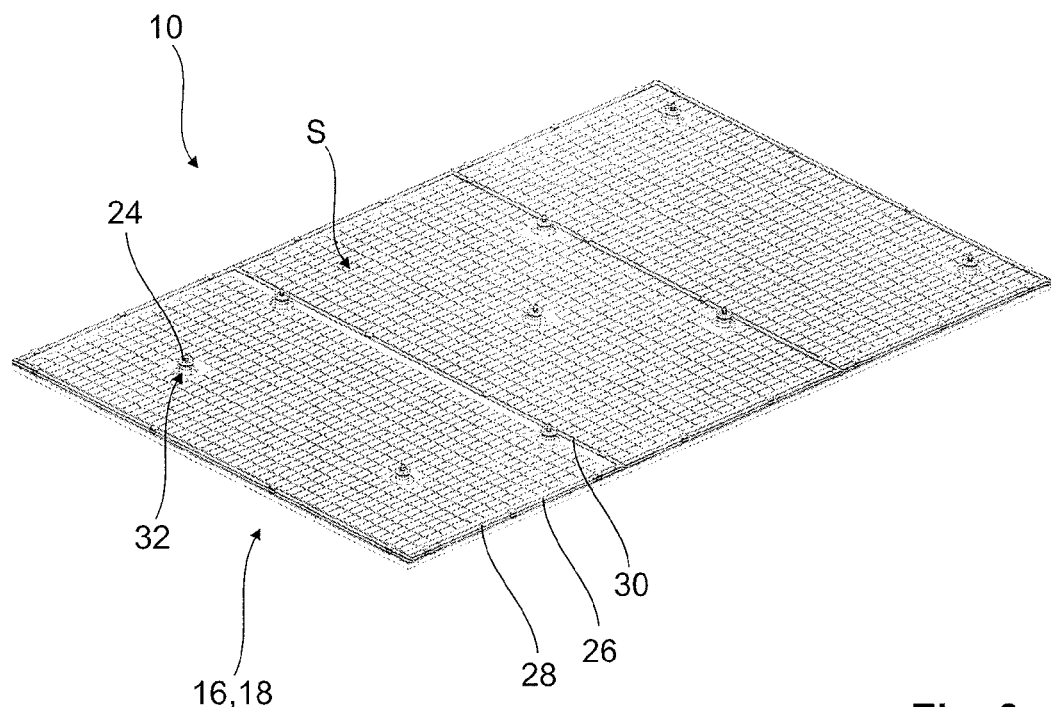
FIG. 3 shows a perspective view of the folded satellite solar generator wing, without the upper fixed solar panel.

In FIG. 3, the solar generator wing 10 is shown in a perspective illustration without the external upper fixed solar panel 14 or 16, so that one of the two semi-fixed solar panels 18 or 20 can be seen. Furthermore, segments of the coupling units 24 are also illustrated.

Preferably, both solar panels 18, 20 are embodied identically.

The semi-fixed solar panel 18, 20 is constructed from a foil, for example, from a reinforced Kevlar foil, on which the solar cells S are mounted. For the semi-fixed solar panel to nevertheless maintain its planar form, the semi-fixed solar panel 18, 20 comprises reinforcing elements 26 which form a frame 28 of the semi fixed solar panel 18, 20 and form additional cross braces 30 that run parallel to the shorter longitudinal sides of the frame 28. The semi-fixed solar panels 18, 20 obtain the necessary rigidity via the reinforcing elements 26. In this way, the desired rigidity of the semi-fixed solar panels 18, 20 can be achieved by the number of the cross braces 30, for example. Alternatively, the desired rigidity can also be achieved through density differences or thickness differences in the foil.

Furthermore, the semi-fixed solar panel 18, 20 comprises multiple openings 32 which are provided in the region of the respective coupling units 24, as can be seen from FIG. 3.

Figure 4:
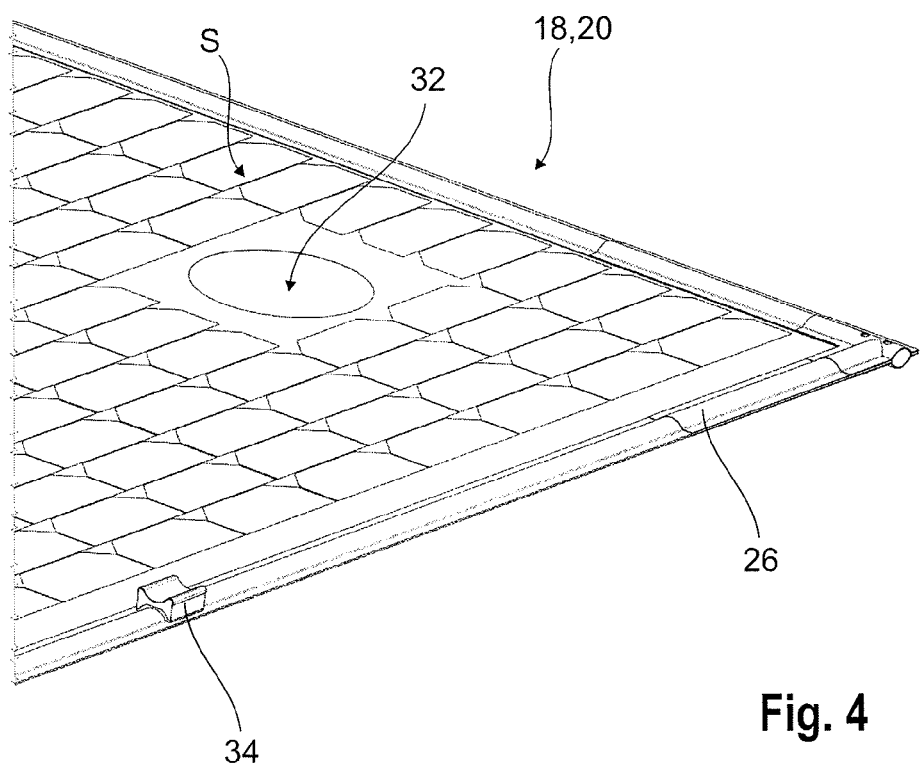
FIG. 4 shows a detailed view of a semi-fixed solar panel from FIG. 3.

In FIG. 4, a partial view of one of the semi-fixed solar panels 18 or 20 is shown.

In this illustration, one of the openings 32 can be readily identified, as well as the arrangement of the solar cells S on a solar cell side of the semi-fixed solar panel 18, 20.

Furthermore, in FIG. 4, a segment of the frame 28 is shown, on which segment a movement restrictor 34 is arranged, the function of which is explained below on the basis of FIGS. 6a, 6b and 7.

Figure 5:
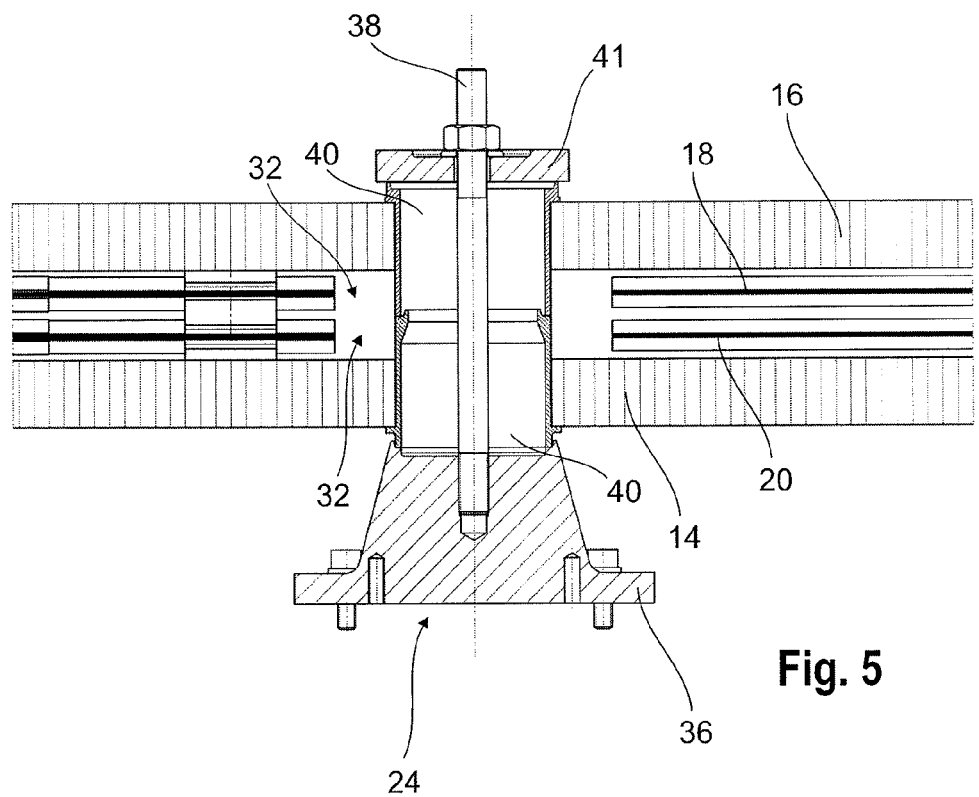
FIG. 5 shows a sectional illustration through the satellite solar generation wing in FIG. 2 in the region of the coupling unit.

In FIG. 5, the satellite solar generator wing 10 from FIG. 2 is shown in cross section. Further, a region of the folded satellite solar generator wing 10 around one of the coupling units 24 is illustrated.

The coupling unit 24 comprises a base element 36 which is attached to the satellite side wall not shown. Furthermore, the coupling unit 24 comprises a pin 38 and respectively one bushing 40 per fixed solar panel 14, 16.

The pin 38 couples the two fixed solar panels 14, 16 to one another in that the pin 38 axially presses the bushings 40 against one another. The pin 38 engages in the base element 36 and an opposing front face 41, so that the fixed solar panels 14, 16 are coupled to the satellite side wall and securely spaced from one another.

The coupling unit 24 is used to securely retain the solar panels 14 through 20 lying on top of one another against the pre-stress of the joints 22 at a predefined distance to one another in the transport position of the panels.

To move the satellite solar generator wing 10 from the transport position shown in FIG. 2 into the operating position shown in FIG. 1, the pin 38 is released, so that the satellite solar generator wing 10 can unfold as a result of the pre-stressed joints 22. The release of the pin 38 can occur pyrotechnically, electrically or mechanically.

Accordingly, the two fixed solar panels 14, 16 are oscillation-coupled to one another by the coupling unit 24 during the launch phase of the carrier rocket. The oscillations of the two fixed solar panels 14, 16 thus interact during the launch phase.

Furthermore, from FIG. 5, it follows that the two semi-fixed solar panels 18, 20 are not coupled to the coupling unit 24, since the pin 38 and the bushings 40 of the coupling unit 24 extend through the respective opening 32 of the semi-fixed solar panels 18, 20 and have a radial distance from the edges of the openings 32.

Via the coupling unit 24 and the openings 32 in the semi-fixed solar panels 18, 20, it is thus achieved that the satellite solar generator wing 10 comprises, in the folded state or in its transport position, two oscillation systems separate from one another. The first oscillation system is formed by the coupled oscillation system of the fixed solar panels 14, 16 and the second oscillation system is formed by the non-coupled, freely oscillating, semi-fixed solar panels 18, 20.

Figure 6A:
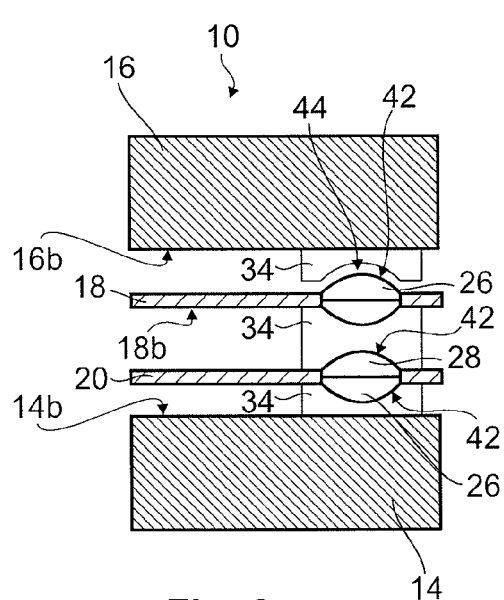
FIG. 6a shows a sectional illustration of the satellite solar generator wing in FIG. 2 in the edge region at a first point in time and load state during the launch phase.
Figure 6B:
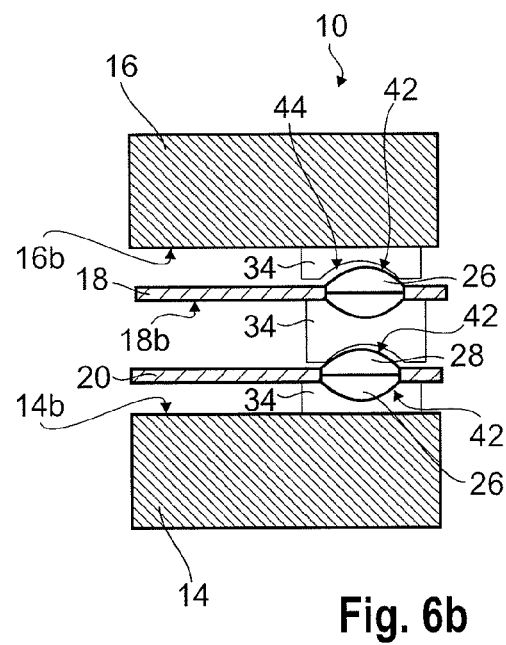
FIG. 6b shows a sectional illustration of the satellite solar generator wing in FIG. 2 in the edge region at a second point in time and load state during the launch phase.
Figure 7:
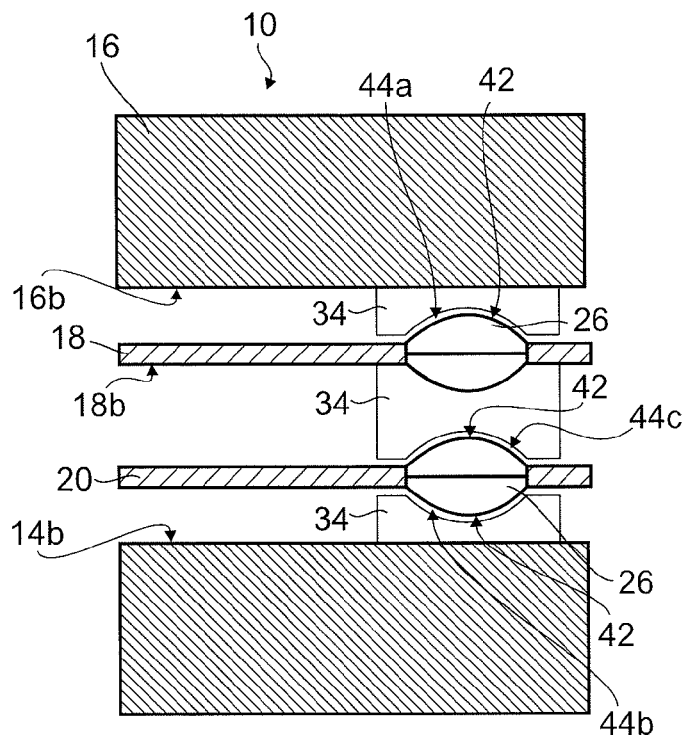
FIG. 7 shows a sectional illustration of the satellite solar generator wing in FIG. 2 in the edge region at a third point in time and load state during the launch phase.

In FIGS. 6a, 6b and 7, the satellite solar generator wing 10 is once again shown in its transport position in an enlarged sectional illustration. Moreover, these figures schematically show an edge region of the satellite solar generator wing 10 at three different points in time and load states during the launch phase.

In the edge region, the semi-fixed solar panels 18, 20 comprise the reinforcing elements 26 which form the frame 28. The reinforcing elements 26 comprise contact surfaces 42 for the movement restrictors 34. The movement restrictors 34 are arranged on top of one another perpendicular to the respective panel plane in the region of the reinforcing elements 26. In this manner, the movement restrictors 34 can interact with the contact surfaces 42 in order to limit the movement of two adjacent solar panels 14 through 20 relative to one another.

As mentioned previously, the two fixed solar panels 14, 16 are kept at a predefined distance from one another via the coupling unit 24, which distance is greater than the height of the semi-fixed solar panels 18, 20 lying therebetween together with the reinforcing elements 26 and movement restrictors 34. It is thus ensured that, in the transport position, a gap 44 is present between at least one movement restrictor 34 and a contact surface 42.

This gap 44 guarantees that the semi-fixed solar panels 18, 20 are positioned in a freely oscillating manner between the two oscillation-coupled fixed solar panels 14, 16. During the launch phase of the carrier rocket, the semi-fixed solar panels 18, 20 can thus freely oscillate relative to the fixed solar panels 14, 16 by at least the width of the gap 44 in a manner perpendicular to the panel plane. The oscillation amplitude of the free relative movement of the semi-fixed solar panels 18, 20 is only limited upon contact by the contact surfaces 42 with the movement restrictors 34.

In the embodiment shown, the two fixed solar panels 14, 16 respectively comprise on their rear side 14b, 16b the movement restrictors 34 which interact with the reinforcing elements 26 of the semi-fixed solar panels 18, 20.

In addition, the semi-fixed solar panel 18 also comprises on its rear side 18b movement restrictors 34 which interact with the contact surfaces 42 of the reinforcing elements 26 of the other semi-fixed solar panel 20 in order to limit the movement of the semi-fixed solar panels 18, 20 relative to one another.

The reinforcing elements 26 of the semi-fixed solar panels 18, 20 thus ensure not only the rigidity of the semi-fixed solar panel 18, 20, but at the same time serve the purpose of limiting the movement amplitude in that they can strike the movement restrictors 34.

The reinforcing elements 26 comprise in cross section a curved, for example, oval shape which is formed from two regions semi-circular in cross section. The reinforcing elements 26 are thereby embodied as sections of a hollow tube and have a height within the range of 4 mm to 18 mm, in particular 11 mm. The reinforcing elements 26 are thereby embodied in an elastically damping manner, as they can deform elastically under stress.

The movement restrictors 34 can also be formed from an elastic material, so that oscillation amplitudes and other movement amplitudes can be even more effectively decelerated and limited in a damping manner.

Furthermore, the shapes of the reinforcing elements 26 and the movement restrictors 34 are matched (in particular, embodied in a mirror-inverted manner) such that movements parallel to the panel plane can also be limited by the movement restrictors 34 and the reinforcing elements 26 engaged with one another.

This is illustrated in FIG. 6b, in which an exemplary load state of the satellite solar generator wing 10 is shown, which state illustrates the maximum deflection of the semi-fixed solar panel 18 on the panel plane.

The movement of the semi-fixed solar panel 18 relative to the immediately adjacent solar panels 14, 20 on the panel plane is limited, since the reinforcing element 26 of the semi-fixed solar panel 18 contacts the movement restrictor 34 of the fixed solar panel 16 with a right edge section of the contact surface 42. Furthermore, the reinforcing element 26 of the semi-fixed solar panel 20 contacts the movement restrictor 34 of the semi-fixed solar panel 18 with a left edge section of the contact surface 42. In this manner, the relative movement of the semi-fixed solar panel 18 on the panel plane is efficiently limited.

Thus, not only is the oscillation amplitude limited, but rather every movement of the semi-fixed solar panels 18, 20 relative to the fixed solar panels 14, 16 is limited beginning at a certain deflection.

The at least one gap 44 and the curves of the movement restrictors 34 and reinforcing elements 26 engaged with one another do not allow a lateral movement of the semi-fixed solar panel 18, 20 out of the fixed solar panels 14, 16 in any relative position.

In this manner, a lateral sliding of the semi-fixed solar panels 18, 20 out of the casing surrounding it, which casing is formed by the two fixed solar panels 14, 16, can be prevented during the launch phase.

In FIG. 7, the satellite solar generator wing 10 is shown at a third point in time or load state during the launch phase, at which a different oscillation state is present that can also be referred to as the neutral position. At this point in time, a gap 44a through 44c lies between each of the movement restrictors 34 and its corresponding contact surface 42. The two semi-fixed solar panels 18, 20 have moved relative to the fixed solar panels 14, 16 such that respectively one gap 44a, 44b has been produced between the movement restrictor 34 arranged on the rear side 14b, 16b of the fixed solar panels 14, 16 and the corresponding contact surface 42. Furthermore, the two semi-fixed solar panels 18, 20 have moved relative to one another such that a gap 44c has been produced between them as well.

From the comparison of FIGS. 6a, 6b and 7, which show two different exemplary oscillation states of the folded satellite solar generator wing 10 during the launch phase, it becomes clear that the semi-fixed solar panels 18, 20 are arranged between the two fixed solar panels 14, 16 in a freely oscillating manner in the transport position, but that they cannot deflect laterally.

Figure 8:
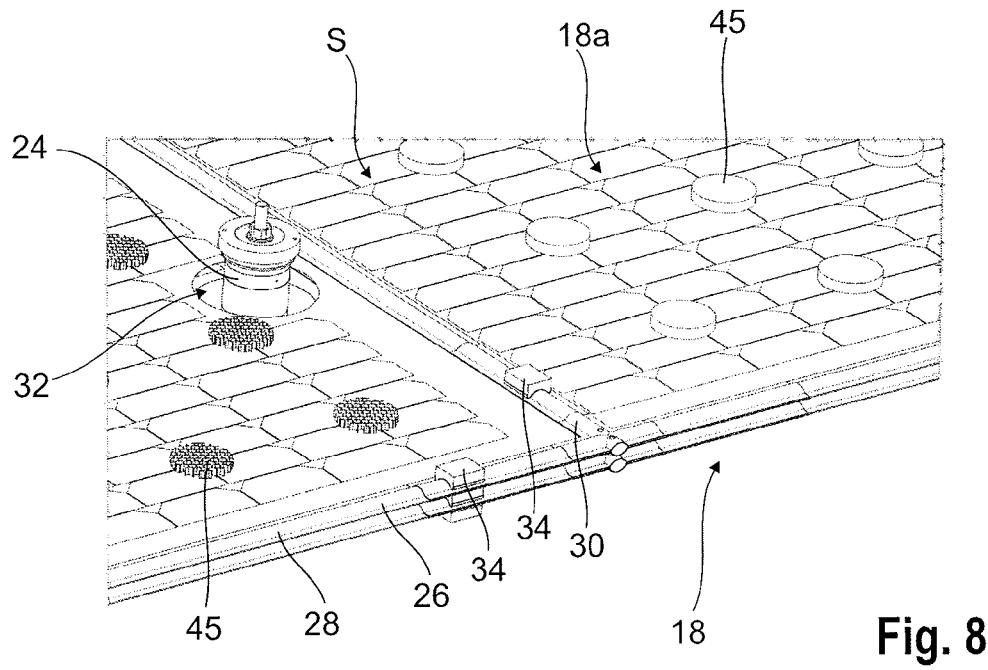
FIG. 8 shows a detailed view of the satellite solar generator wing in FIG. 3, wherein the fixed solar panel shown in FIG. 3 is omitted to improve clarity.

In FIG. 8, the folded satellite solar generator wing 10 is shown in a perspective illustration, so that the upper fixed solar panel 16 is not shown.

The movement restrictors 34 arranged on the rear side 16b of the upper fixed solar panel 16 are illustrated, however, and bear against the reinforcing elements 26 or the corresponding contact surfaces 42 in the illustration shown.

Furthermore, it follows from FIG. 8 that the bushings 40 of the coupling unit 24 extend through the opening 32 without touching the edge thereof. From this, it then becomes clear that the semi-fixed solar panels 18, 20 are not coupled to the coupling unit 24.

The openings 32 are also sized such that no contact occurs between the bushings 40 and the edge of the opening 32, despite the maximum deflection of the semi-fixed solar panels 18, 20. For this purpose, the openings 32 are embodied in a roughly circular manner and have a diameter of 50 mm to 150 mm, in particular 100 mm.

The foil of the semi-fixed solar panels 18, 20 furthermore has a thickness of 50 μm to 200 μm, in particular 100 μm, so that the semi-fixed solar panels 18, 20 can also unfold in an unimpeded manner. In contrast, the fixed solar panels 14, 16, which are constructed from a CFRP honeycomb structure, have a thickness of 15 mm to 25 mm. This thickness provides adequate protection against the radiation in outer space.

In addition, several different damping elements 45 are provided in FIG. 8 which are arranged on the solar cell side 18a of the semi-fixed solar panel 18. The damping elements 45 are even partially arranged on the solar cells S themselves. In addition, the damping elements 45 can also be arranged in recesses of the solar cells S, so as not to impair the active surface of the solar cells S.

Additionally, damping elements 45 of this type can also be arranged on the rear side, which is not shown here, of the semi-fixed solar panels 16, 18. These damping elements 45 can, for example, interact with the damping elements 45 on the opposing solar cell side of the adjacent solar panel.

Generally, the damping elements 45 are intended to protect the solar cells S. Damping elements 45 of this type can be provided on all solar cell sides 14a through 20a of the solar panels 14 through 20 in order to protect the solar cells S. The damping elements 45 form additional movement restrictors which are only operative after the closing of the gap 44 or gaps 44a-44c.

Figure 9:
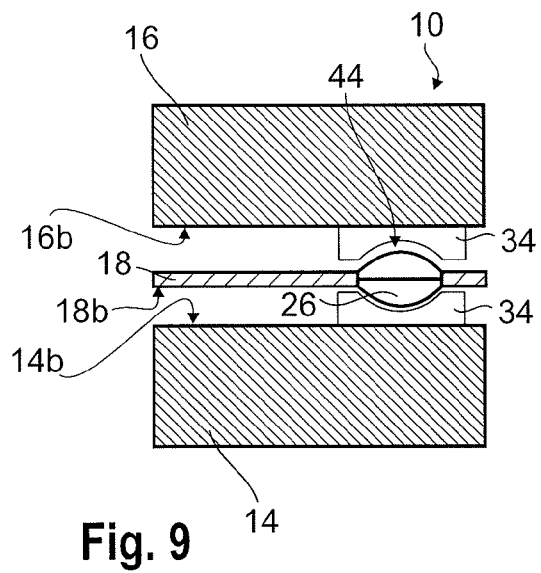
FIG. 9 shows a sectional illustration of the satellite solar generator wing in its transport position in the edge region according to a second embodiment.

In FIG. 9, a second embodiment of the satellite solar generator wing 10 is illustrated which comprises two fixed solar panels 14, 16 and only one semi-fixed solar panel 18. The semi-fixed solar panel 18 is arranged between the two fixed solar panels 14, 16. The two fixed solar panels 14, 16 comprise movement restrictors 34 on their respective rear sides 14b, 16b. The movement restrictors 34 interact with the reinforcing elements 26 or the contact surfaces 42 of the semi-fixed solar panel 18 in a manner analogous to the previously described embodiment, so that the movement amplitudes of the semi-fixed solar panel 18 are limited.

Alternatively, it can also be provided that more than two semi-fixed solar panels that can oscillate freely are arranged between two oscillation-coupled fixed solar panels 14, 16. For this purpose, it is merely necessary to adjust the distance between the two fixed solar panels 14, 16 accordingly by the coupling unit 24.

Figure 10:
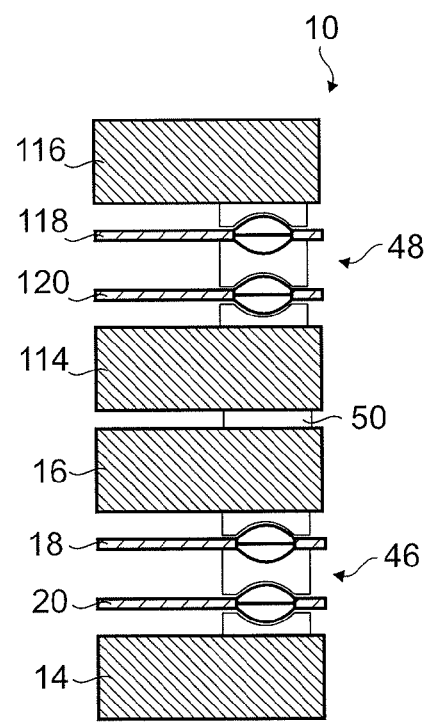
FIG. 10 shows a sectional illustration of the satellite solar generator wing in its transport position in the edge region according to a third embodiment.

In FIG. 10, a third embodiment of the satellite solar generator wing 10 is shown which comprises four fixed solar panels 14, 16, 114, 116 and four semi-fixed solar panels 18, 20, 118, 120, that is, eight solar panels in total.

In the embodiment shown, two semi-fixed solar panels 18, 20 are respectively arranged between two fixed solar panels 14, 16 in a known manner. These two semi-fixed solar panels 18, 20 and the two fixed solar panels 14, 16 surrounding them form a first panel system 46 of the satellite solar generator wing 10.

Analogously, the two other semi-fixed solar panels 118, 120 and the two fixed solar panels 114, 116 form a second panel system 48 of the satellite solar generator wing 10, so that the satellite solar generator wing 10 according to the third embodiment is constructed from two panel systems 46, 48.

Furthermore, on the front side of at least one of the two fixed solar panels 16, 114, at least one damping element 50 is provided which prevents the two solar cell sides 16*a*, 114*a* of the two solar panels 16, 114 arranged opposite of one another from contacting each other during the oscillations, whereby the solar cells S would be damaged. This damping element 50 is primarily necessary when the solar panel systems 46, 48 are not oscillation-coupled to one another.

The fixed solar panels 14, 16, 114, 116 of the third embodiment can be oscillation-coupled to one another by a shared coupling unit 24, so that the satellite solar generator wing 10 in the third embodiment also comprises a first oscillation system that is formed from all fixed solar panels 14, 16, 114, 116.

Furthermore, other additional panel systems can also be provided for a satellite solar generator wing 10. The result of this is that the satellite solar generator wing 10 can be modularly expanded, preferably by two fixed solar panels with intermediately positioned semi-fixed solar panels.

With a satellite solar generator wing 10 of this type, a power-to-weight ratio of over 150 W/kg can be achieved, so that all masses are included.

Figure 11:
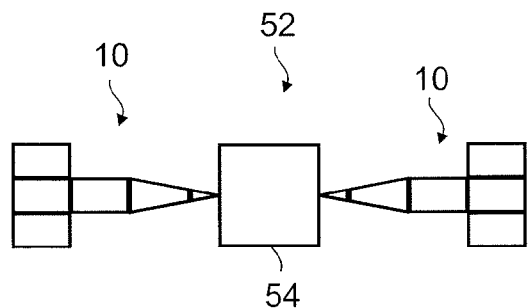
FIG. 11 shows a schematic illustration of a satellite according to the invention.

Additionally, in FIG. 11 a satellite 52 is illustrated schematically which comprises a satellite body 54 and two satellite solar generator wings 10 of the type described previously, which wings are attached to opposite sides of the satellite body 54.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A satellite solar generator wing comprising:
   solar panels including at least two fixed solar panels and at least one semi-fixed solar panel,
   wherein the solar panels are connected to one another in order to assume an operating position and a transport position, and
   wherein, in the transport position, the solar panels are retained on top of one another, and the semi-fixed solar panel is connected to one of the at least two fixed solar panels via a joint arranged at a first edge of the semi-fixed solar panel and is decoupled from the at least two fixed solar panels between the first edge and at least one second edge different from the first edge, so that the semi-fixed solar panel can oscillate between the at least two fixed solar panels.

2. The satellite solar generator wing according to claim 1, further comprising at least one coupling unit that is structured and arranged to be releasable to assume the operating position, and is structured and arranged to couple the two fixed solar panels to one another in the transport position.

3. The satellite solar generator wing according to claim 1, wherein the at least two fixed solar panels are oscillation-coupled to one another in the transport position.

4. The satellite solar generator wing according to claim 3, wherein the at least two fixed solar panels are oscillation-coupled to one another in the transport position by at least one coupling unit.

5. The satellite solar generator wing according to claim 2, wherein the semi-fixed solar panel comprises at least one opening located in a region of the at least one coupling unit that is dimensioned so that at least one segment of the at least one coupling unit extends through the opening without binding the semi-fixed solar panel to the at least one coupling unit.

6. The satellite solar generator wing according to claim 1, further comprising movement restrictors structured and arranged to limit movement amplitude of the semi-fixed solar panels relative to the fixed solar panels.

7. The satellite solar generator wing according to claim 6, wherein at least the fixed solar panels comprise the movement restrictors.

8. The satellite solar generator wing according to claim 7, wherein, in the transport position, a gap is present between the movement restrictors and a corresponding contact surface on an opposing component, in order to allow oscillation of the solar panels relative to one another.

9. The satellite solar generator wing according to claim 8, wherein the movement restrictors and the corresponding contact surfaces are embodied so as to limit movements of the semi-fixed solar panel relative to the fixed solar panels on the panel plane.

10. The satellite solar generator wing according to claim 9, wherein, in the transport position, the movement restrictors and the corresponding contact surfaces are engageable with one another and secure the semi-fixed solar panel against a lateral deflection between the fixed solar panels.

11. The satellite solar generator wing according to claim 1, further comprising reinforcing elements on the at least one semi-fixed solar panel.

12. The satellite solar generator wing according to claim 11, wherein the reinforcing elements have contact surfaces arranged to face movement restrictors in order to limit a movement amplitude of the semi-fixed solar panel.

13. The satellite solar generator wing according to one of claim 12, wherein the reinforcing elements form at least one frame for the semi-fixed solar panel.

14. The satellite solar generation wing according to claim 1, wherein the at least one semi-fixed solar panel comprises two semi-fixed solar panels arranged to lie directly on top of one another in the transport position and arranged in a freely oscillating manner between two fixed solar panels in the transport position.

15. The satellite solar generator wing according to claim 14, wherein at least one of the two semi-fixed solar panels comprises movement restrictors structured and arranged to limit an amplitude of the movement relative to the other of the two semi-fixed solar panel.

16. The satellite solar generator wing according to claim 1, wherein the two fixed solar panels and the at least one semi-fixed solar panel form a solar panel system.

17. The satellite solar generator wing according to claim 16, comprising a plurality of the solar panel systems.

18. A satellite comprising at least one satellite solar generator wing according to claim 1.

19. A method for deploying a satellite that assumes a transport position and operating position, the method comprising:
   connecting solar panels of a satellite solar generator wing, which include at least two-fixed panels and at least one semi-fixed panel, to one another; and
   arranging the solar panels in the transport position so that the solar panels are arranged one on top of the other,
   wherein the at least one semi-fixed solar panel is connected to one of the at least two fixed solar panels via a joint arranged at a first edge of the at least one semi-fixed solar panel and is decoupled from the at least two fixed solar panels between the first edge and at least one second edge different from the first edge, so that the at least one semi-fixed solar panel can oscillate manner between the at least two fixed solar panels.

20. The method according to claim 19, further comprising releasing the solar panels from the transport position so that the satellite solar wing generator assumes an operating position.

* * * * *